United States Patent [19]
Jensen

[11] 3,930,718
[45] Jan. 6, 1976

[54] ELECTRO-OPTIC MODULATOR

[75] Inventor: Richard E. Jensen, Columbia, Md.

[73] Assignee: The United States of America as represented by the Secretary of the Navy, Washington, D.C.

[22] Filed: Apr. 12, 1974

[21] Appl. No.: 460,419

[52] U.S. Cl............ 350/160 R; 350/162 R; 356/112
[51] Int. Cl.² .......................................... G02F 1/32
[58] Field of Search...... 350/160 R, 162 R; 356/112

[56] References Cited
UNITED STATES PATENTS

| | | | |
|---|---|---|---|
| 3,282,148 | 11/1966 | Yamada | 350/162 R |
| 3,498,693 | 3/1970 | Fein et al. | 356/112 |
| 3,626,511 | 12/1971 | Hammer | 350/160 R |
| 3,787,111 | 1/1974 | Giordmaine et al. | 350/160 R |
| 3,813,142 | 5/1974 | Buhrer | 350/160 R |

OTHER PUBLICATIONS

Analysis...Acoutstic Surface Waves on One Mirror; Hunsinger Applied Optics; Vol. 10, No. 2; Feb. 71; pp. 390–395.

Primary Examiner—Vincent P. McGraw
Attorney, Agent, or Firm—R. S. Sciascia; J. A. Cooke

[57] ABSTRACT

An electro-optic modulator used to modulate coherent light beams by the application of an electric potential. It combines a Fabry-Perot etalon and a diffraction grating in a single unit. An etalon is constructed with an electro-optic material between reflecting surfaces. A voltage applied between alternate, spaced-apart electrodes of a metal grid attached to one reflecting surface induces a diffraction grating in the electro optic material. Light entering the etalon is diffracted, reflected and efficiently coupled out.

6 Claims, 5 Drawing Figures

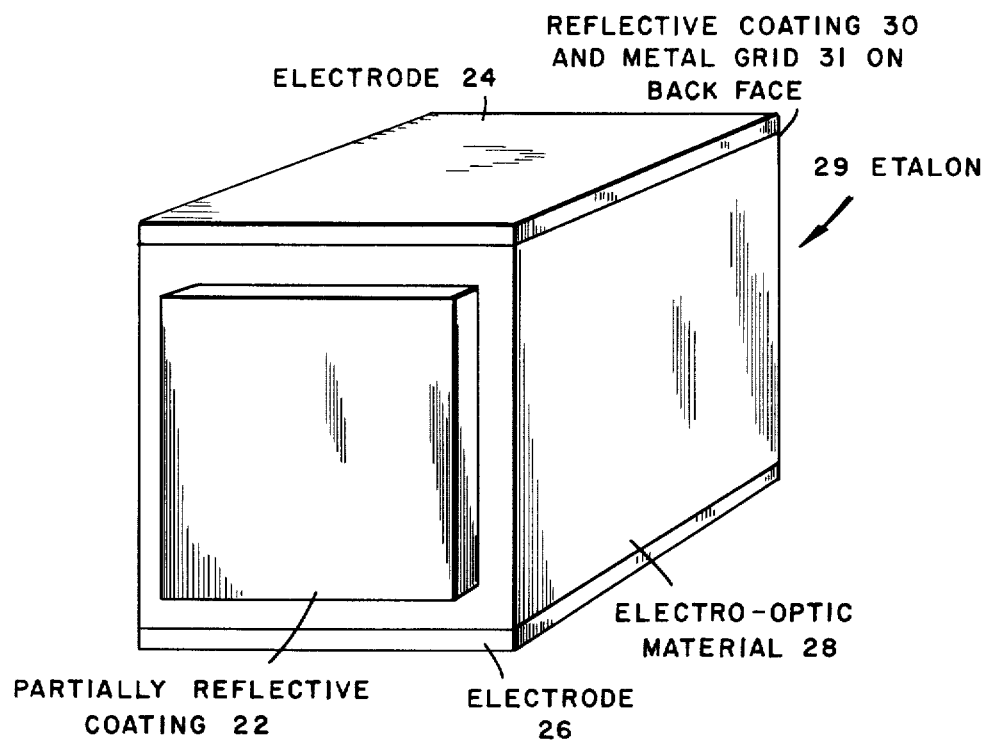
FIG. 4 ALTERNATIVE EMBODIMENT
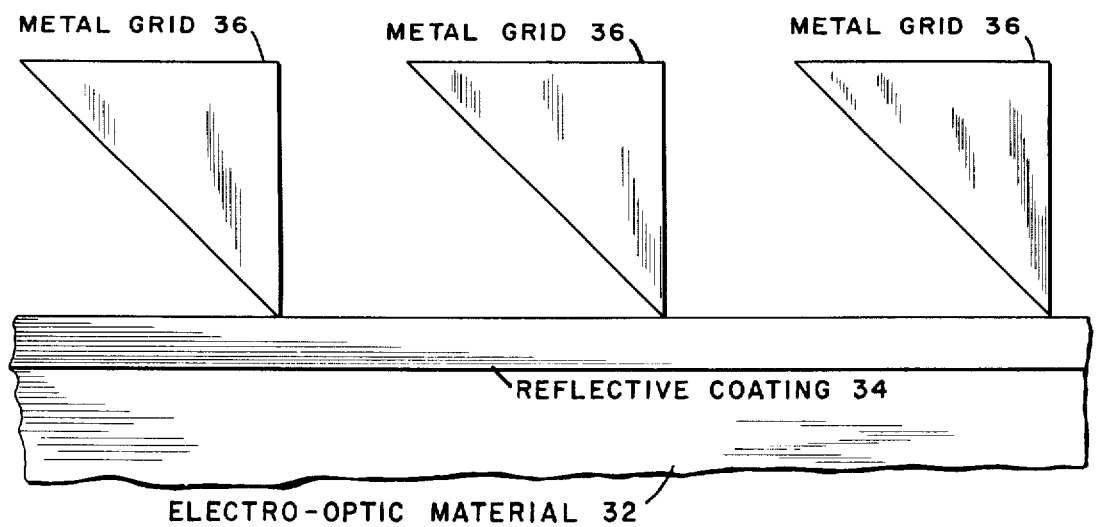
FIG. 5

ELECTRO-OPTIC MODULATOR

BACKGROUND OF THE INVENTION

The present invention relates generally to optical systems and elements and more specifically to polarization and modulation of coherent light sources using electrically responsive materials. Devices for performing these functions have been known in the prior art as electro-optic modulators. Generally, these devices operate by directing a light beam to be modulated onto a modulator material and applying an electrical field to the modulator material to cause a change of refraction of the material thereby causing a phase change to be induced between the two polarization components of the incident light beam. Depending upon the polarization of the incident beam, the resultant light beam may be either polarization, phase, or frequency modulated by the modulator material. If the beam is polarly modulated, it may be followed by a polarization analyzer which will result in a beam which is only intensity modulated.

In order to efficiently modulate the input beam, a phase shift of approximately 180° must be induced by the modulator. For the prior devices this requires voltage levels of a few thousand volts for most materials. In addition, modulation at high frequencies requires a great deal of power because of the high voltages. Thus the conventional electro-optic modulator requires inconveniently high voltages and, at high frequencies, high powers.

Although other types of modulators, such as mechanical and acousto-optic modulators have been devised, they have been found to be incapable of modulating at frequencies as high as the electro-optical modulators.

SUMMARY OF THE INVENTION

The present invention overcomes these disadvantages and limitations of the prior art by providing an improved electro-optical modulator. The invention consists of a Fabry-Perot etalon, an electro-optical material, and a diffraction grating in a single device. The diffraction grating is induced in the etalon by the electro-optic effect such that light entering the etalon is diffracted and efficiently coupled out.

It is therefore an object of the present invention to provide an improved electro-optical modulator.

It is also an object of the present invention to provide an electro-optic modulator which operates at low voltages.

Another object of the present invention to provide an electro-optic modulator which operates at low power.

Another object of the present invention is to provide an electro-optic modulator which operates at high frequencies.

It is still another object of this invention to provide the means for diffracting light entering an etalon.

Other objects, advantages and novel features of the invention will become apparent from the following detailed description of the invention when considered in conjunction with the accompanying drawings wherein:

BRIEF DESCRIPTION OF THE DRAWINGS

FIG. 4 is a perspective view of an alternative embodiment.

FIG. 5 is a side view of additional alternative embodiment.

DETAILED DESCRIPTION OF THE PREFERRED EMBODIMENT

Figure 1:
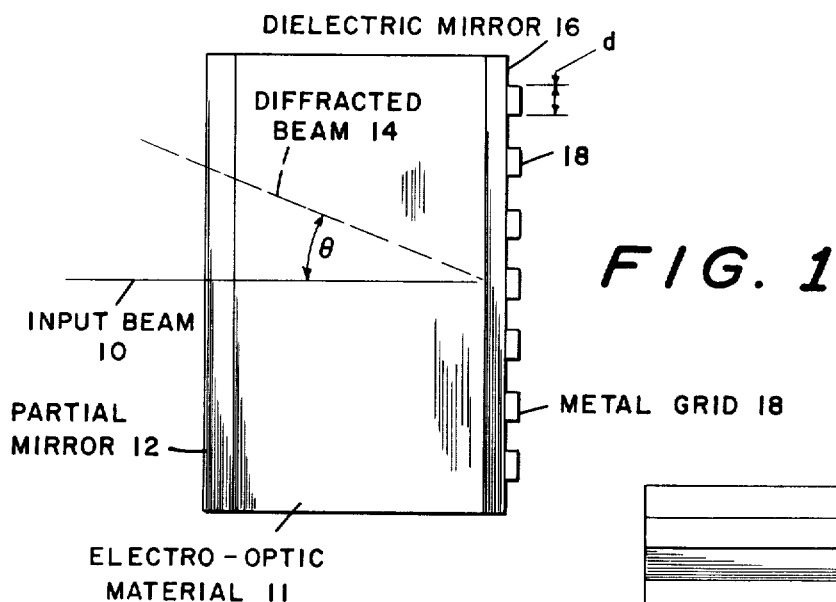
FIG. 1 is a side view of an etalon showing one embodiment of the invention.

FIG. 1 shows the preferred embodiment of the proposed electro-optic modulator. It consists basically of a Fabry-Perot etalon made of an electro-optic material. The back surface as shown both in FIGS. 1 and 2 has a multilayer dielectric coating 16 which reflects nearly 100% of the incident light beam 10. A metal grid 18 formed by an array of parallel electrodes is placed on top of this coating with alternate grid lines electrically connected together. The front surface is coated with a partially reflective mirror 12. The application of a voltage between alternate electrodes of metal grid 18 will create an electric field between each pair of alternate grid electrodes that extends into the electro-optic material. These electric fields form parallel planes approximately perpendicular to dielectric coating 16 and partial mirror 12. A refractive index change in the electro-optic material 11 which will result in those planes of the electro-optic material 11 where an electric field exists. Parallel planar gaps corresponding to a planar projection of the shadow of the cross-sectional dimension $d$ of the closest grid electrode separate adjacent electric fields. As the index of refraction is changed where an electric field exists, the gaps form a set of diffraction grating slits of width $d$. Input light beam 10 passing through a slit is diffracted at an angle $\theta$ determined by the laws of diffraction [$\theta = \sin^{-1}(n\lambda/d)$ for normal incidence]. The resulting components of a diffracted beam are reflected by dielectric mirror 16.

Figure 2:
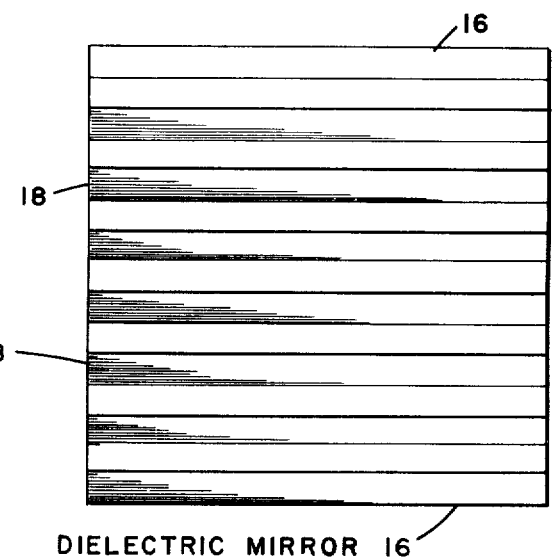
FIG. 2 is a back view of the embodiment shown in FIG. 1.
Figure 3:
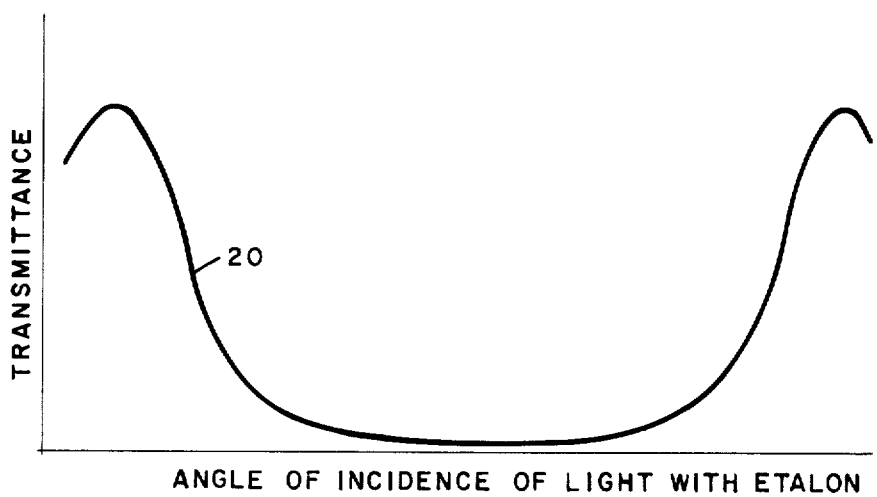
FIG. 3 is a graph of the transmittance plotted against the angle of incidence of light with the etalon for the embodiment shown in FIG. 1.

FIG. 3 is a plot the transmittance of the device of FIGS. 1 and 2 as a function of the angle of the light beam with the normal to the device. When the device is rotated so that the diffraction angle $\theta$ corresponds to maximum transmittance, the diffracted beam will be strongly coupled out. It will emerge at a different angle than light reflected from the back or front surface and therefore may be separated from them. Complete amplitude or intensity modulation of the light can be obtained since there is no light diffracted when no voltage is applied to the metal grid 18. For some applications the device can be tilted to obtain stronger diffraction to one side.

Since etalons in general depend on multiple reflections, this device requires a much lower voltage than a conventional modulator to obtain efficient modulation.

The primary advantages of the present invention are:

a. it does not require a polarizer and analyzer and may be used with light of any polarization.

b. One hundred percent amplitude or intensity modulation can be obtained.

c. The voltage and power necessary to drive the modulator are much smaller than for a conventional electro-optic modulator.

Obviously many modifications and variations of the present invention are possible in light of the above teachings. For example, electrodes 24 and 26 may be placed on opposite sides of the etalon 29, as shown in FIG. 4. No connections are necessary between electrodes 24 and 26 and the metal grid 31. The presence of the grid 31 on one surface will cause a periodic disturbance in the electric field between the two electrodes 24 and 26.

In addition, the front surface 22 of the etalon 29 may be made conducting as well as partially reflecting. The optical thickness of the etalon 29 may be changed by applying a bias voltage to the front surface. This bias may be used to tune the etalon 29 rather than rotating it. Alternatively, electrodes on the sides may be used instead, if the material exhibits the quadratic electro-optic effect.

Also, different voltages may be applied to different grid lines. This technique may be used to induce in the electro-optic material 28 a phase grating of a different spacing than the grid 31. Together with the techniques discussed above for tuning the device, this technique may be used as a beam steering device.

Furthermore, the dielectric coating on the back face may be made partially transmitting or omitted and the metal grid placed directly on the surface. This grid will cause diffraction at the angles determined by the wave length and grid spacing. By applying different voltages to the grid lines, as discussed above, phase gratings with different spacings can be induced in the material. This will allow transmission of the diffracted beam through the device.

An alternative grid for use with the disclosed devices is shown in FIG. 5. The metal grid 36 may be made to have a triangular cross-section as shown so that the field induced in the electro-optic material 32 is substantially similar in shape to the metal grid 36. This causes diffraction of most of the light to one side since the diffraction grating induced by the electrical field has a triangular shape similar to the cross-sectional shape of the metal grid 36 unlike rectangularly shaped metal grids such as grid 18.

It is therefore to be understood that within the scope of the appended claims the invention may be practiced otherwise than as specifically described.

Although each of the foregoing illustrative embodiments was described as having metal grids with electrodes of either rectangular or triangular cross-section, it should be apparent that the devices can likewise be provided according to the invention with electrodes of other as well as different cross-sectional geometric description.

Electro-optic modulators constructed in accordance with the present invention may be made to operate on a wide range of the light spectrum including the visible, infrared and ultraviolet. Accordingly, use of the words light and optical, in this application should be taken in a broad sense so as to encompass the light spectrum so defined. The embodiments described should be taken as illustrative of the invention and not as a limitation thereon.

What is claimed as new and desired to be secured by Letters Patent of the United States is:

1. An electro-optic modulator for modulating a coherent beam of light comprising:

a Fabry-Perot etalon including a first and a second parallel reflective surface, constructed of an electro-optic material;

electrically charged metal grating means including an array of alternately connected electrodes of triangular cross-section attached to one reflective surface of said Fabry-Perot etalon for creating an electrically induced diffraction grating within said Fabry-Perot etalon to modulate said coherent beam of light;

wherein said coherent beam of light is reflected a multiple number of times within said Fabry-Perot etalong such that said coherent beam of light is diffracted said multiple number of times by said electrically induced diffraction grating thereby reducing the magnitude of an electrical signal required on said electrically charged metal grating from that required without said multiple reflections to produce a predetermined deviation of said coherent light beam.

2. An electro-optic modulator for modulating a coherent beam of light incident thereon comprising:

electro-optic material;

a partial mirror attached to a first side of said electro-optic material;

a dielectric reflective coating having a coefficient of reflectivity substantially equal to 100% applied to a second side of said electro-optic material opposite said partial mirror;

grid means for producing, by the application of an electrical charge to said grid means, a diffraction grating in said electro-optic material to modulate said coherent beam of light;

means for applying an electrical field in said electro-optic material which is substantially perpendicular to said coherent beam of light passing through said partial mirror and said electro-optic material and impingent upon said dielectric reflective coating;

wherein said coherent beam of light is reflected a multiple number of times between said partial mirror and said reflective coating such that said electrically induced diffraction grating causes said coherent beam of light to be diffracted by the application of an electrical charge having an amplitude reduced by said multiple number of reflections from that amplitude required to produce a predetermined deviation of said coherent beam of light without said multiple number of reflections.

3. The modulator of claim 2 wherein said grid means comprises a metal grating having a triangular cross-sectional shape.

4. The electro-optical modulator described in claim 2 wherein said partial mirror comprises a second dielectric reflective coating.

5. The electro-optic modulator described in claim 2 wherein said partial mirror comprises an electrical conductor.

6. The electro-optic modulator described in claim 2 wherein a first and a second electrode are attached to opposite sides of said etalon in planes perpendicular to said dielectric coating.

* * * * *